FITZ WILLIAM SARGENT.
BRAKE HEAD.
APPLICATION FILED MAY 4, 1915.
1,160,453.
Patented Nov. 16, 1915.
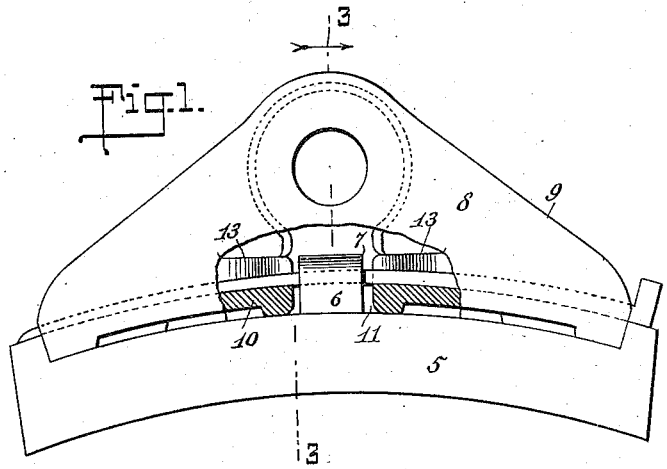
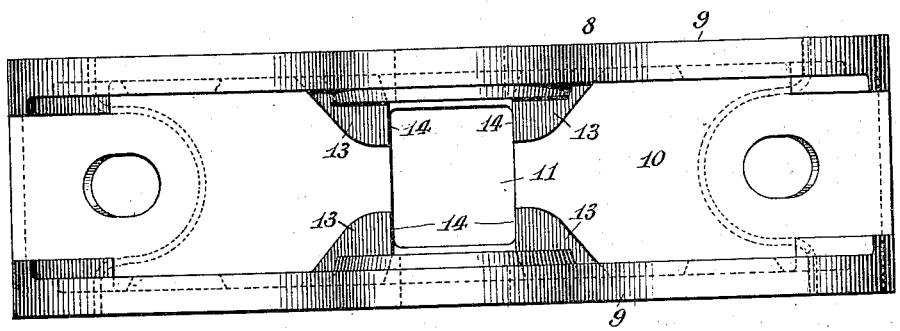
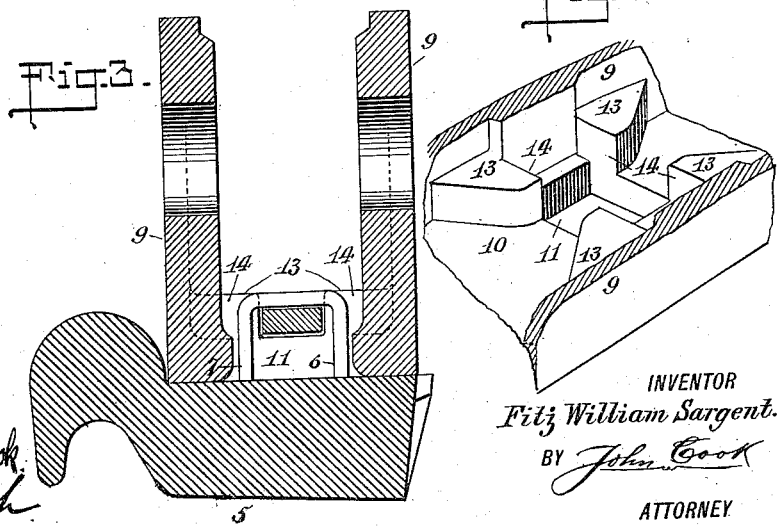
WITNESSES
INVENTOR
Fitz William Sargent.
BY John Cook
ATTORNEY

UNITED STATES PATENT OFFICE.

FITZ WILLIAM SARGENT, OF MAHWAH, NEW JERSEY, ASSIGNOR TO AMERICAN BRAKE SHOE & FOUNDRY COMPANY, OF MAHWAH, NEW JERSEY, A CORPORATION OF NEW JERSEY.

BRAKE-HEAD.

1,160,453.  Specification of Letters Patent.  Patented Nov. 16, 1915.

Application filed May 4, 1915. Serial No. 25,676.

*To all whom it may concern:*

Be it known that I, FITZ WILLIAM SARGENT, a citizen of the United States, and a resident of Mahwah, in the county of Bergen and State of New Jersey, have made and invented certain new and useful Improvements in Brake-Heads, of which the following is a specification.

This invention relates to an improved brake head, and has for its object to reduce the wear which is ordinarily experienced between the lug of the brake shoe and the side walls of the brake head opening through which the aforesaid lug extends, the foregoing being accomplished without materially increasing the weight of, or in any wise weakening, the brake head.

A further object is to accomplish the foregoing in such manner that guides are formed which materially facilitate the passage of the securing key through the opening in the brake shoe lug.

With these and other ends in view, my invention consists in certain novel features of construction and combinations of parts as will hereinafter appear, it being understood that changes in the precise embodiment of the invention can be made within the scope of what is claimed without departing from the spirit thereof.

The preferred embodiment of my invention is disclosed in the accompanying drawings, wherein:—

Figure 1 is a view in side elevation of my improved brake head, the same being illustrated with a brake shoe keyed thereto, and with portions of the brake head broken away and disclosed in section; Fig. 2 is a top plan view of the same; Fig. 3 is a view in section, taken on the line 3—3 of Fig. 1; Fig. 4 is a fragmental view in perspective, clearly disclosing the novel features of construction of the brake head.

Referring specifically to the several views, the brake shoe 5 includes the centrally disposed lug 6 which is of the wrought metal type, and which, due to its limited thickness, and the therefore limited area of its exposed sides 7, is particularly liable to become worn, and to wear the sides of the brake head opening through which the lug extends.

The brake head 8 is of the usual outline, and includes the side walls or flanges 9 and back 10, the latter being provided, approximately centrally of its length, with the opening 11, through which the brake shoe lug 6 extends. The brake shoe lug protrudes above the top surface of the back 10, and in order to realize and obtain the full benefit of the exposed area of the sides of the key lug, I provide the brake head with the four lugs 13, which rise to a height approximating the protrusion of the brake shoe lug, and they are therefore adapted to contact with the same throughout its entire height. The lugs 13 project centrally from the side walls of the brake head, as well as upwardly from the back, and define the shoulders or ledges 14, the same forming a continuation of the walls of the opening 11, and thus materially increase the area of contact between the brake shoe lug and the brake head, and thus reduce or prevent the wear therebetween.

The lugs 13 taper in a direction toward the ends of the brake head, so as to form guides for directing the securing key into the opening within the brake shoe lug. The limited space between the side walls of the brake head and the rather inaccessible position of the brake shoe lug when protruding through the opening in the back of the brake head, have heretofore been the cause of considerable trouble in keying the brake shoe to the brake head. However, with the present construction, the tapering lugs form guides, providing for the ready insertion of the key into the opening within the brake shoe lug. The lugs or abutments extend only to a height approximating the protrusion of the brake shoe lug, and accordingly do not interfere with the brake lever. The lugs, while not adding materially to the weight of the brake head, practically eliminate the wear between the brake shoe lug and the walls of the brake head opening.

What I claim is:—

1. A brake head including a back with an opening therein for the reception of a brake shoe lug, said brake head provided with tapering abutments adapted to guide the brake head key to its seated position within the brake shoe lug.

2. A brake head including a back with an opening therein for the reception of the brake shoe lug, said brake head provided with tapering abutments forming guides for the brake head key, and arranged to contact with the brake shoe lug to materially increase the bearing surface therebetween.

3. A brake head including a back with an opening therein and centrally projecting lugs arranged at the sides of said opening and defining shoulders forming a continuation of the walls of said opening, the remote portions of said lugs tapering toward the ends of the brake head and forming guides for directing the brake head key into the brake shoe lug.

Signed at Mahwah, in the county of Bergen and State of New Jersey, this 29th day of April, A. D. 1915.

FITZ WILLIAM SARGENT.

Witnesses:
 CHARLES N. WINTER,
 CHESTER D. JONES.

Copies of this patent may be obtained for five cents each, by addressing the "Commissioner of Patents, Washington, D. C."